H. T. HEATH.
FLOAT VALVE MECHANISM.
APPLICATION FILED AUG. 22, 1917.
1,295,987.
Patented Mar. 4, 1919.
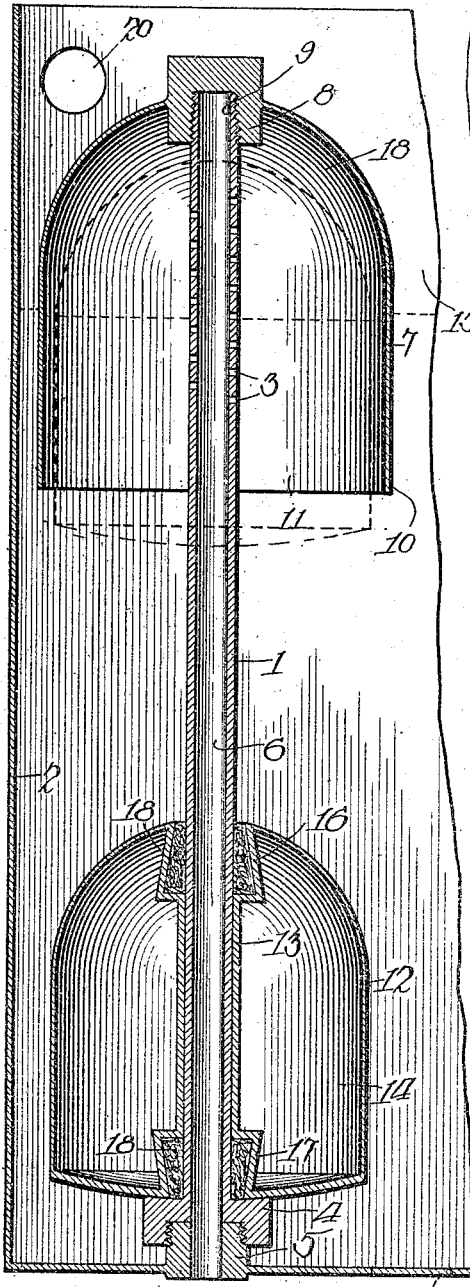
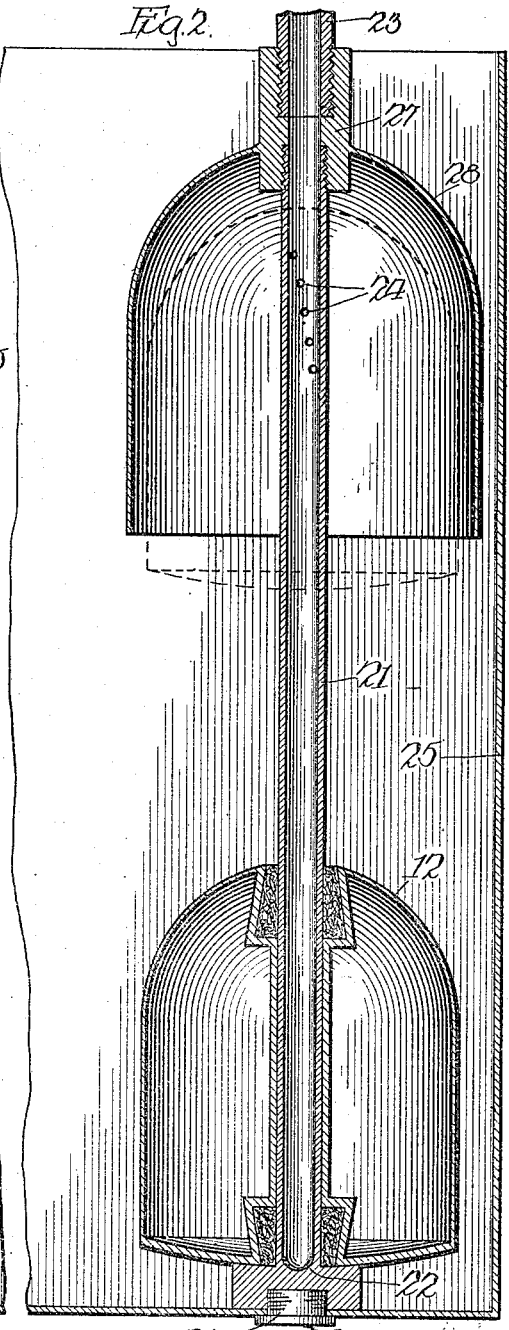
Inventor:
Howard T Heath
By Harry Irwin Cromer
Atty.

UNITED STATES PATENT OFFICE.

HOWARD T. HEATH, OF ELGIN, ILLINOIS.

FLOAT-VALVE MECHANISM.

1,295,987. Specification of Letters Patent. Patented Mar. 4, 1919.

Application filed August 22, 1917. Serial No. 187,694.

*To all whom it may concern:*

Be it known that I, HOWARD T. HEATH, a citizen of the United States, residing in Elgin, in the county of Kane and State of Illinois, have invented certain new and useful Improvements in Float-Valve Mechanisms, of which the following is a specification.

This invention relates to that class of float valve mechanisms which are adapted to be used for controlling the level of liquid in a container, such for instance as a flush tank.

The principal object of the invention is to provide a simple, economical and efficient float valve mechanism.

Other and further objects of the invention will appear from an examination of the following description and claims, and from an inspection of the accompanying drawings, which are made a part hereof.

The invention consists in the features, combinations, parts and details of construction herein described and claimed.

In the accompanying drawings, Figure 1 is a view in vertical section of a float valve mechanism constructed in accordance with my invention and improvements, showing the same in a tank, with a portion of the tank omitted—the float valve being shown in full lines in lowered passage-opening position; and in broken lines in raised or passage-closing position; and Fig. 2 is a similar view of a modified form of my improved float valve mechanism or liquid-level-controlling device, showing a conduit or pipe adapted to admit liquid to the container, from above.

In constructing a float valve mechanism or liquid-level-controlling device in accordance with my invention and improvements, I provide a liquid inlet or supply conduit or pipe 1 which is mounted in position to extend into a liquid-container in the form of a flush tank or reservoir 2. The liquid-container may be of any desired, well known or suitable form, and it is not deemed necessary or desirable to describe the same in detail, in order to enable those skilled in the art to understand and use the invention.

The pipe 1 extends into the tank, or is so constructed and arranged that all or a portion of said pipe is located inside of the tank and in vertical or upright position, when the device is in operation or in use. The upright upper portion of the pipe is provided with a series of discharge openings 3 in the periphery thereof. These openings are located in progressive or successive order lengthwise or longitudinally of the pipe, or in different horizontal planes, the uppermost opening being at or above the highest level to which it is intended that the water or liquid shall be permitted to rise in the tank, and the lowermost of the series of inlet openings being located below the level of the surface of the water when the latter is at its highest predetermined level in the tank.

One end of the pipe is closed by suitable means, which may be of any desired known or suitable form; and the pipe is connected at its other extremity with a suitable source of water supply, such, for instance, as a water main containing water under pressure. In the form of the device shown in Fig. 1, the lower extremity of the pipe 1 is provided with a threaded head or coupling member 4, which may be made in one integral piece with the body of the pipe, and is in threaded engagement with a tubular member or pipe 5 secured in water tight engagement with the bottom or lower wall of the tank and adapted to form a passage leading from a source of water supply and communicating with the liquid inlet passage 6 formed by the pipe 1.

The upper extremity of the pipe 1 shown in Fig. 1 is provided with a hollow, preferably bell-shaped hood or canopy 7 having an upper annular threaded cap or plug 8 at the axial center of the hood and in threaded engagement with the threaded upper end portion 9 of the pipe 1, and forming a closure for said pipe.

This bell-shaped hood is, by preference, in the form of an inverted cup or bell; and its bottom annular rim or edge 10 encircles the pipe 1 at a point below the level of the highest plane to which the water is to be permitted to rise in the tank. The bottom of the hood is open, and the bottom opening 11 or open bottom extremity of the hood is sufficiently large in diameter to admit a part and, by preference, the main body portion of a float valve 12 which is slidably mounted upon and encircles the pipe 1. This float valve comprises in its construction an annular valve sleeve portion 13 which is imperforate and encircles and is in slidable engagement with the pipe 1, and is connected at the opposite extremities of said sleeve with the outer float which is by preference in the form of a hollow casing encircling the sleeve 13, and adapted to form a closed air-tight chamber 14 of suitable dimensions to cause the float valve to be raised from lower passage-opening position, in which it is shown in full lines in Fig. 1, to raised passage-closing position, in which it is indicated in broken lines in said figure, when the water admitted into the tank through the openings 3 reaches the highest predetermined level to which it is to be allowed to rise in the tank. The position of the surface of the water when at the high level last mentioned, is indicated by the broken line 15 in Fig. 1.

The valve sleeve has packing boxes or chambers 16 and 17 at its opposite ends. These packing boxes may be made in one integral piece with the valve sleeve, by enlarging or expanding the opposite extremities of the sleeve, and are, by preference, tapered, so that each is of smaller diameter at its outer end than at its inner end. Suitable packing material 18 is forced into and compressed in each packing box, so as to fit snugly in water tight but slidable engagement with the pipe 1, and form a tapered annular packing ring which encircles the pipe and fills the tapered annular chamber formed by the tapered walls of the packing box. These packing rings may be made of any desired packing material suitable for packing the opposite extremities of the valve so as to permit the valve to be raised by means of the water admitted into the tank through the openings 3 so as to close said openings progressively or successively until all are closed at the moment when the water reaches the highest level which it is to be permitted to reach, and prevent leakage. I prefer to employ a compressible packing material impregnated with oil and forced into the packing chamber under heavy hydraulic pressure, and adapted to provide a water-tight packing which will produce as little friction as possible consistent with the objects to be accomplished.

The hood or bell-shaped cup 7 forms an air chamber 18, the bottom of which is closed and sealed by a liquid seal when the float valve 12 is raised to passage closing position or in the operation of closing the passages, and the water admitted through the openings 3 reaches a level as high or higher than the bottom rim or edge of the hood. When the float valve has been raised to passage-closing position, as shown in broken lines in Fig. 1, and the bottom opening is partially filled by the float valve, and sealed with a liquid seal, it is plain that the air confined in the chamber 18 between the walls of the float and the walls of the hood will be compressed, or under pressure, and that the pressure of the air thus confined in the chamber of the hood will tend to press the float valve downward. The float valve is thus moved downward from its uppermost passage-closing position by air pressure and by the action of gravity, when the water contained in the tank is permitted to escape so as to lower the water level below the level indicated by the line 15.

The tank 2, may be provided with an outlet opening at 19 which may be controlled by any desired ordinary and well known form of valve mechanism, and may have an overflow passage 20. It is obvious, however that my improved device is adapted to operate in or in connection with many different forms of liquid container, and that the container may be of any desired known or suitable form.

In Fig. 2 is shown a modification of my improved device in which a pipe 21, having a closed bottom end 22 and having its upper extremity connected with a liquid supply pipe 23 which is adapted to be connected with a source of water supply, and having a series of discharge openings 24 in said pipe 21, is mounted in upright position in a tank 25, the bottom of the pipe 21 being secured to the bottom of the tank by means of a threaded boss 26, or similar or other desired securing means. The pipe 21 is connected with the supply pipe 23 by means of a nipple or connection 27, which is in threaded engagement with the ends of said pipes, and fixed to a bell-shaped cup or hood 28 which surrounds the pipe above the openings 24 and extends downward to a point below the level of the lowermost of said openings, so that all of the openings are within the hood just as the openings 3 are within and surrounded by the hood 7, already described. A float valve 12, which may be identical in all respects with the float valve shown in Fig. 1, is slidably mounted on the pipe 21, and is adapted to operate in the same manner as the float valve 12 already described, and shown in Fig. 1.

The discharge openings 3 and 24 are each much smaller in area or cross-section than the corresponding passage with which they communicate. With these relatively small openings arranged in progressive or consecutive order lengthwise of the inlet pipe in the periphery of which they are located, the full volume of water contained in the inlet pipe—that is to say, a volume of water equal to the full capacity of the pipe—may be permitted to pass through the openings when the entire series of openings are open, and the pressure may be as great as is desirable in practice, and yet the float valve will operate to close each discharge opening successively in its order until all are closed and the flow of water through said passages and into the liquid-container is stopped in an efficient manner.

I claim:

1. In a valve mechanism of the class described, the combination of a liquid supply pipe provided with a series of discharge openings in the periphery thereof adapted to discharge liquid into a liquid container, a float valve encircling and in slidable engagement with said pipe and acting to open and close said openings successively, and a hood mounted above the float valve and forming an air chamber having an open bottom portion adapted to admit the upper portion of the float valve when the latter is in raised position, the bottom of the hood being in position to be sealed by liquid surrounding the float valve when said liquid reaches a desired predetermined level.

2. In a valve mechanism of the class described, the combination of a liquid inlet pipe provided with a series of peripheral discharge openings located in successive order lengthwise of the pipe and adapted to discharge liquid into a liquid container, a liquid container into which said pipe extends, a float valve located in said liquid container and encircling and in slidable engagement with said pipe and adapted to open and close said peripheral openings successively, and a bell-shaped hood encircling said pipe above said openings and above the float valve and having a bottom opening adapted to admit the upper portion of the float valve when the latter is in raised passage-closing position, the bottom extremity of said hood being in position to be closed and sealed by liquid contained in said container when said liquid reaches a desired predetermined level.

Signed at Chicago, Illinois, August 17, 1917.

HOWARD T. HEATH.

Witnesses:
 HARRY IRWIN PROMER,
 W. HARDING.

Copies of this patent may be obtained for five cents each, by addressing the "Commissioner of Patents, Washington, D. C."